(12) United States Patent
Jiang et al.

(10) Patent No.: US 7,576,600 B2
(45) Date of Patent: Aug. 18, 2009

(54) SUPPLY VOLTAGE SWITCHING CIRCUIT

(75) Inventors: Wu Jiang, Shenzhen (CN); Yong-Zhao Huang, Shenzhen (CN); Yun Li, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 678 days.

(21) Appl. No.: 11/300,699

(22) Filed: Dec. 15, 2005

(65) Prior Publication Data

US 2006/0139829 A1    Jun. 29, 2006

(30) Foreign Application Priority Data

Dec. 25, 2004   (CN)   .................. 2004 1 0091889

(51) Int. Cl.
*H02J 1/00*        (2006.01)
*H03K 17/00*     (2006.01)
*H01H 67/00*     (2006.01)

(52) U.S. Cl. .................. 327/544; 327/530; 307/80

(58) Field of Classification Search .............. None
See application file for complete search history.

(56) References Cited

U.S. PATENT DOCUMENTS

| 4,694,430 | A | * | 9/1987 | Rosier | ............... 365/185.23 |
| 5,457,414 | A | * | 10/1995 | Inglis et al. | ............... 327/77 |
| 5,517,153 | A | | 5/1996 | Yin et al. | ............... 327/546 |
| 7,215,043 | B2 | * | 5/2007 | Tsai et al. | ............... 307/130 |

\* cited by examiner

*Primary Examiner*—Lincoln Donovan
*Assistant Examiner*—Terry L Englund

(57) ABSTRACT

A supply voltage switching circuit for a computer includes a chipset, a first transistor and a second transistor. The chipset includes a first MOSFET and a second MOSFET. A 5V system voltage and a 5V standby voltage are respectively inputted to sources of the first MOSFET and the second MOSFET. Gates of the first MOSFET and the second MOSFET are respectively coupled to collectors of the first transistor and the second transistor. Emitters of the first transistor and the second transistor are coupled to a first terminal for receiving a control signal. A 1.8V standby voltage is separately inputted to bases of the first transistor and the second transistor. A 12V system voltage and the 5V standby voltage are respectively inputted to collectors of the first transistor and the second transistor. A second terminal is connected between the drain of the first MOSFET and the drain of the second MOSFET.

13 Claims, 3 Drawing Sheets

SUPPLY VOLTAGE SWITCHING CIRCUIT

CROSS-REFERENCE TO RELATED APPLICATION

Related subject matter is disclosed in a U.S. patent application with application Ser. No. 11/300,760, entitled "SUPPLY VOLTAGE SWITCHING CIRCUIT", filed on Dec. 15, 2005, and issued on Oct. 23, 2007 as U.S. Pat. No. 7,286,005, which is assigned to the same assignee as that of the present application.

BACKGROUND

1. Field of the Invention

The present invention relates to a supply voltage switching circuit for a computer, and more particularly to a supply voltage switching circuit which can prevent the computer from being down when the computer is waken up.

2. General Background

In general, a user can make a computer go to a sleep mode through a user setting in Advanced Configuration and Power Interface (ACPI), in order to protect the computer and save energy. The user can also wake up the sleeping computer by peripheral equipments such as keyboard, mouse, Universal Serial Bus (USB) and etc.

A working voltage is provided by a supply voltage switching circuit. When the computer is at a work mode, the supply voltage switching circuit provides a 5V system voltage (5V_SYS). When the computer is at a sleep mode, the supply voltage switching circuit provides a 5V standby voltage (5V_SB).

Referring to FIG. 3, a typical supply voltage switching circuit for a computer includes a chipset 3', a metal-oxide-semiconductor field-effect transistor (MOSFET) Q1' and a MOSFET Q2'. The MOSFET Q1' and the MOSFET Q2'are N-channel-strengthen MOSFETS. A gate of the MOSFET Q1' is connected to a terminal 2'. A source of the MOSFET Q1' is grounded. A drain of the MOSFET Q1' is coupled to a 5V_SB. A gate of the MOSFET Q2' is connected to the drain of the MOSFET Q1'. A source of the MOSFET Q2' is grounded. A drain of the MOSFET Q2' is coupled to a 12V_SYS. The chipset 3' includes a MOSFET Q3',and a MOSFET Q4'. The MOSFET Q3' is an N-channel-strengthen MOSFET and the MOSFET Q4' is P-channel-strengthen MOSFET. A gate of the MOSFET Q3' is coupled to a 12V_SYS. A source of the MOSFET Q3' is coupled to a 5V_SYS. A drain of the MOSFET Q3' is connected to a terminal 1'. A gate of the MOSFET Q4' is coupled to the 12V_SYS. A source of the MOSFET Q4' is coupled to the 5V_SB. A drain of the MOSFET Q4' is connected to the terminal 1'.

A working process of the typical supply voltage switching circuit includes two stages. At the first stage, the computer is at a sleep mode, and a low level voltage from the computer is inputted to the gate of the MOSFET Q1' via the terminal 2'. The MOSFET Q1' is turned off and the MOSFET Q2' is turned on. So an outputted voltage of the drain of the MOSFET Q2' is at a low level. Because the MOSFET Q4' is a P-channel-strengthen MOSFET and the MOSFET Q3' is an N-channel-strengthen MOSFET, the MOSFET Q4' is turned on and the MOSFET Q3' is turned off. So the terminal 1' outputs the 5V_SB at the first stage. At the second stage, the computer is at a work mode, and a power-ok (PWR-OK) signal from the computer is inputted to the gate of the MOSFET Q1' via the terminal 2'. The MOSFET Q1' is turned on and an inputted voltage of the gate of the MOSFET Q2' is at a low level. So the MOSFET Q2' is turned off and the 12V_SYS is outputted to the gates of the MOSFET Q3' and the MOSFET Q4'. The MOSFET Q3' is turned on and the MOSFET Q4' is turned off. So the terminal 1' outputs the 5V_SYS at the second stage. That is, when the PWR-OK signal is inputted to the typical supply voltage switching circuit, the terminal 1' outputs the 5V_SYS.

However, the typical supply voltage switching has a disadvantage. Because the 12V_SYS is inputted to the gates of the MOSFET Q3' and the MOSFET Q4' at the same time, the MOSFET Q4' is turned off quickly before the MOSFET Q3' is turned on. So the outputted voltage of the terminal 1' has a great voltage drop. When a computer is waken up at a sleep mode, the computer will be down because of the voltage drop.

What is needed is a supply voltage switching circuit for a computer which can prevent the computer from being down when the computer is waken up.

SUMMARY

A supply voltage switching circuit for a computer includes a chipset, a first transistor and a second transistor. The chipset includes a first MOSFET and a second MOSFET. A 5V system voltage and a 5V standby voltage are respectively inputted to sources of the first MOSFET and the second MOSFET. Gates of the first MOSFET and the second MOSFET are respectively coupled to collectors of the first transistor and the second transistor. Emitters of the first transistor and the second transistor are separately coupled to a first terminal for receiving a control signal from the computer. A 1.8V standby voltage is separately inputted to bases of the first transistor and the second transistor. A 12V system voltage and the 5V standby voltage are respectively inputted to collectors of the first transistor and the second transistor. A second terminal for outputting a voltage to the computer is connected between a drain of the first MOSFET and a drain of the second MOSFET.

Because the 12V system voltage and the 5V standby voltage are respectively inputted to the gates of the first MOSFET and the second MOSFET, a voltage drop of the circuit is greatly reduced. So the supply voltage switching circuit of present invention can prevent the computer from being down when being waken up.

Other advantages and novel features will become more apparent from the following detailed description when taken in conjunction with the accompanying drawings, in which:

DETAILED DESCRIPTION OF THE EMBODIMENT

Figure 1:
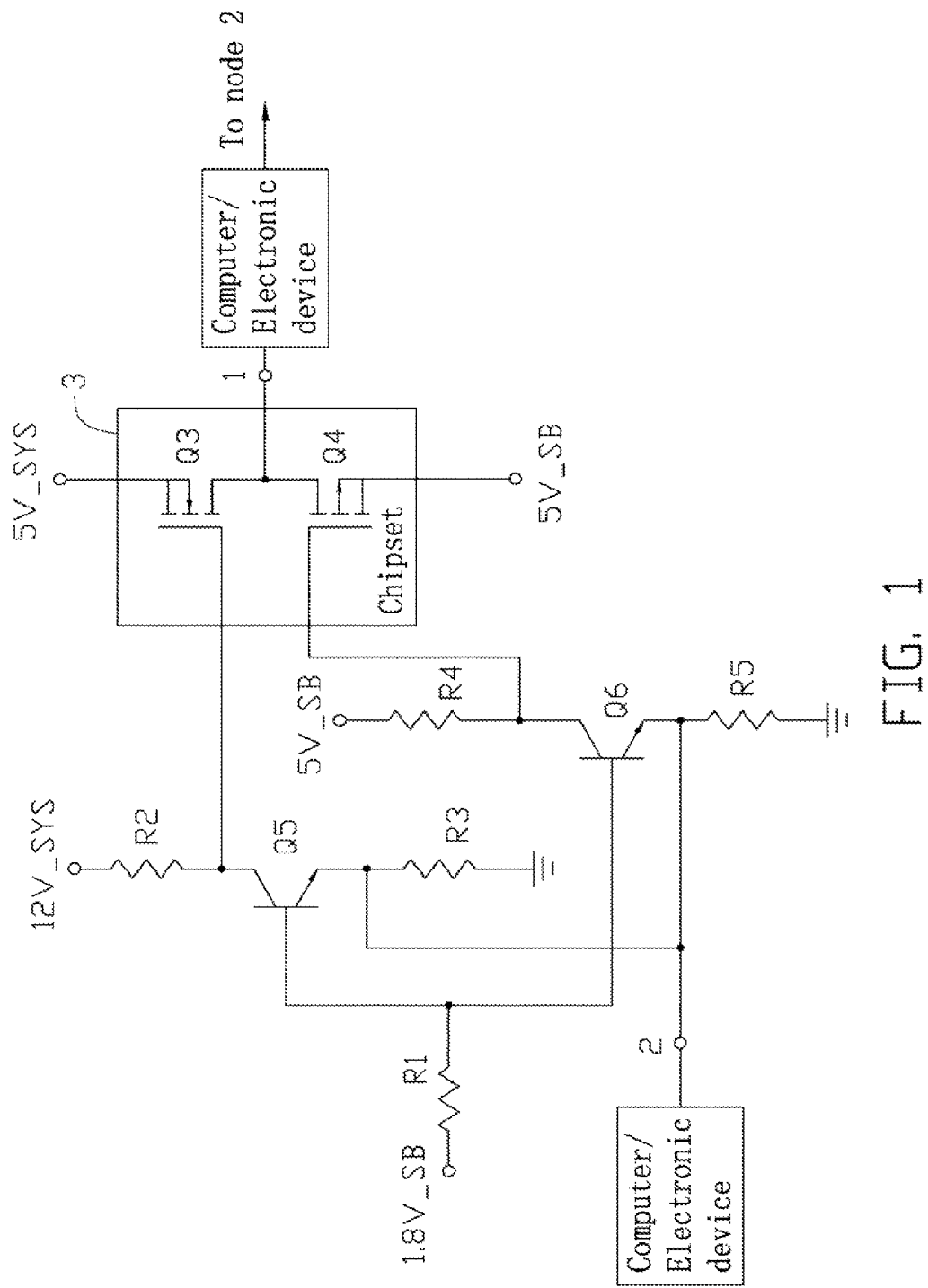
FIG. 1 is a circuit diagram of a supply voltage switching circuit for a computer, in accordance with a preferred embodiment of the present invention.

Referring to FIG. 1, a supply voltage switching circuit of a preferred embodiment of the present invention for an electronic device like a computer is shown. The supply voltage switching circuit comprises a chipset 3, a bipolar junction transistor (BJT) Q5, and a BJT Q6. The chipset 3 comprises a MOSFET Q3 and a MOSFET Q4. The MOSFET Q3 is an N-channel-strengthen MOSFET and the MOSFET Q4 is a P-channel-strengthen MOSFET. A 1.8V standby voltage (1.8V_SB) used as a common control power is inputted to a base of the BJT Q5 and the BJT Q6 via a resistor R1. An emitter of the BJT Q5 is coupled to a terminal 2 for receiving a control signal from a computer and grounded via a resistor R3. A collector of the BJT Q5 is coupled to a 12V_SYS used as one control power via a resistor R2. A base of the BJT Q6 is connected to the base of the BJT Q5. An emitter of the BJT Q6 is connected to the emitter of the BJT Q5 and is grounded via a resistor R5. A 5V_SB provided as another control power is inputted to a collector of the BJT Q6 via a resistor R4. A gate of the MOSFET Q3 is connected to the collector of the BJT Q5. A 5V_SYS provided as one power source is inputted to a source of the MOSFET Q3. A gate of the MOSFET Q4 is connected to the collector of the BJT Q6. A 5V_SB provided as another power source is inputted to the source of the MOSFET Q4. A node between a drain of the MOSFET Q3 and a drain of the MOSFET Q4 is connected to a terminal 1.

A working process of the supply voltage switching circuit includes two stages. At the first stage, the computer is at a sleep mode, and a low level voltage from the computer is separately inputted to the emitter of the BJT Q5 and the emitter of the BJT Q6 via the terminal 2. So a voltage between the base and the emitter of the BJT Q5 is 1.8V and the BJT Q5 is turned on. A voltage between the base and the emitter of the BJT Q6 is 1.8V and the BJT Q6 is turned on. Thus, output voltages of the collector of the BJT Q5 and the collector of the BJT Q6 are at low levels. Because the MOSFET Q3 is an N-channel-strengthen MOSFET and the MOSFET Q4 is a P-channel-strengthen MOSFET, the MOSFET Q3 is turned off and the MOSFET Q4 is turned on. Therefore the terminal 1 outputs the 5V_SB at the first stage. At the second stage, the computer is at a work mode, and a PWR-OK signal from the computer is inputted to the collector of the BJT Q5 and the collector of the BJT Q6 via the terminal 2. Therefore the voltage between the base and the emitter of the BJT Q5 is at a low level and the BJT Q5 is turned off. The voltage between the base and the emitter of the BJT Q6 is also at a low level and the BJT Q6 is turned off. Thus, the 12V_SYS is inputted to the gate of the MOSFET Q3 and the 5V_SYS is inputted to the gate of the MOSFET Q4, thereby the MOSFET Q3 is turned on and the MOSFET Q4 is turned off. Therefore the terminal 1 outputs the 5V_SYS at the second stage. That is, when the PWR-OK signal is inputted to the supply voltage switching circuit, the terminal 1 outputs the 5V_SYS.

Because the 12V_SYS and the 5V_SB are separately inputted to the gate of the MOSFET Q3 and the gate of the MOSFET Q4, a voltage drop of the outputted voltage of the terminal 1 is greatly reduced.

Figure 2:
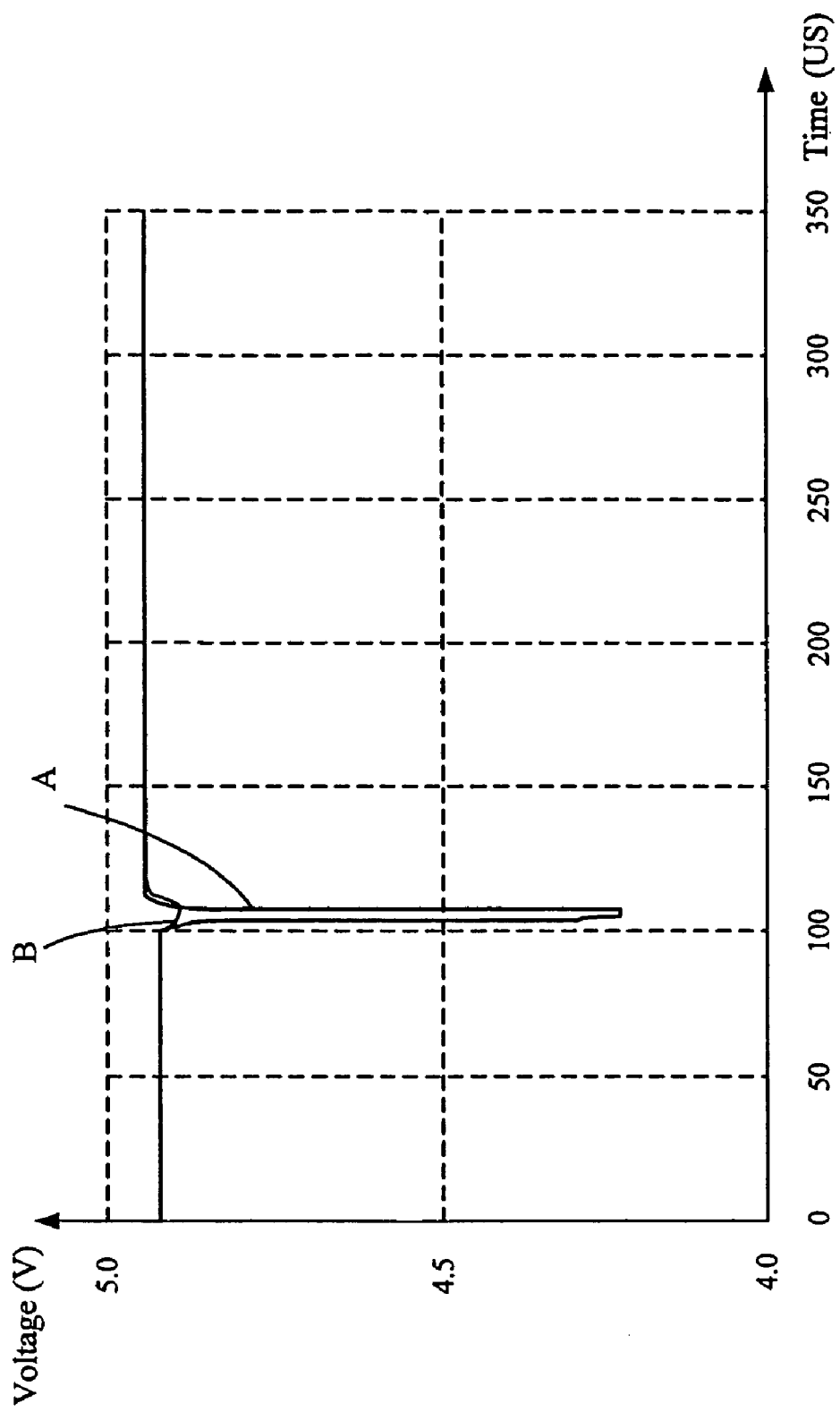
FIG. 2 is a diagram of output waveforms from the supply voltage switching circuit of FIG. 1 in comparison with that of a typical supply voltage switching circuit.
Figure 3:
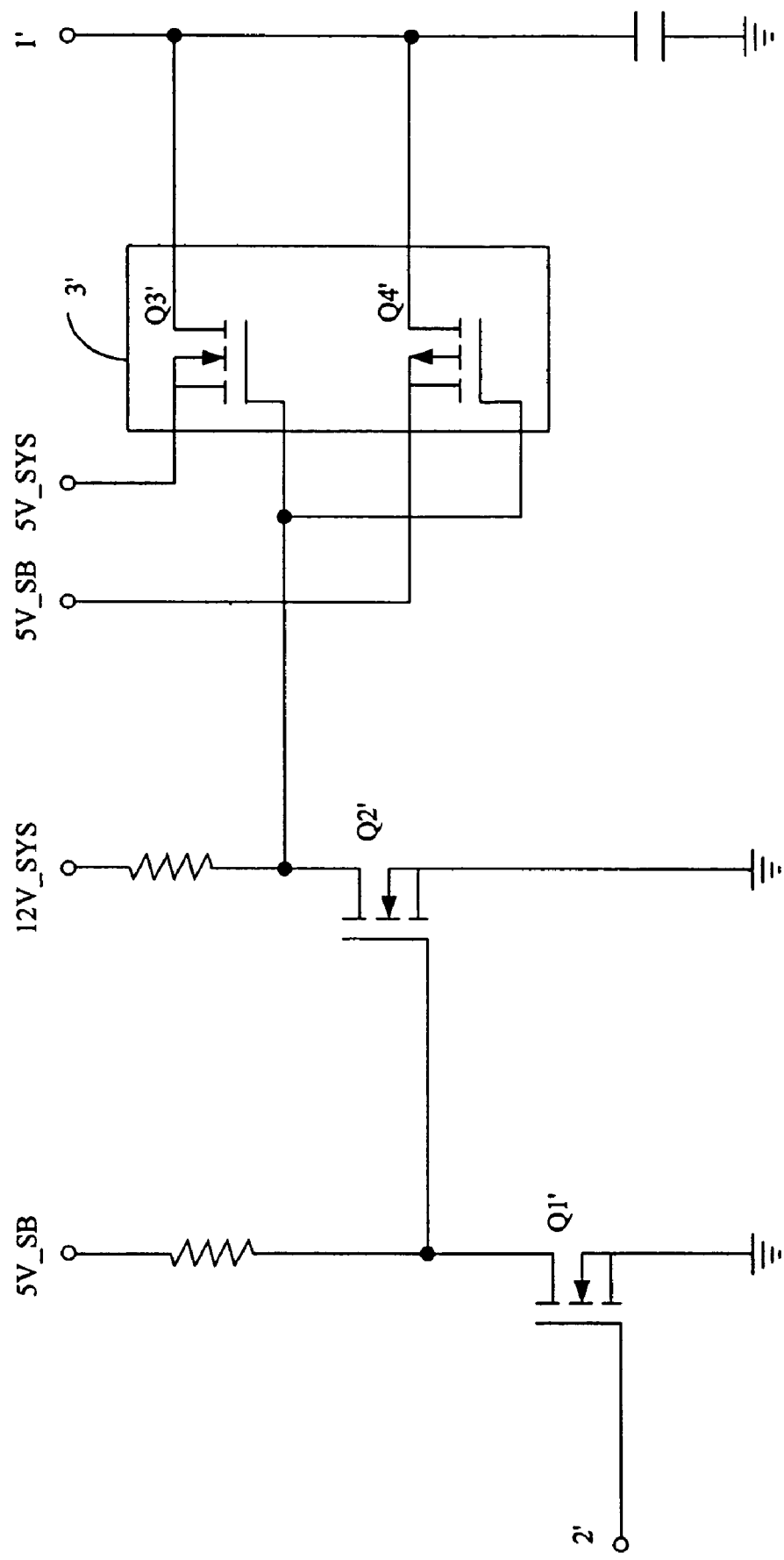
FIG. 3 is a circuit diagram of the typical supply voltage switching circuit for a computer.

Referring FIG. 2, it is a diagram of an output waveform from the supply voltage switching circuit of FIG. 1 in comparison with that of a typical supply voltage switching circuit. A waveform B is a waveform of the supply voltage switching circuit in accordance with the embodiment of the present invention. A waveform A is a waveform of the typical supply voltage switching circuit. Evidently, the waveform B has a more voltage drop than the waveform A. So the supply voltage switching circuit of the present invention can prevent the computer from being down when being waken up.

It is believed that the present embodiment and its advantages will be understood from the foregoing description, and it will be apparent that various changes may be made thereto without departing from the spirit and scope of the invention or sacrificing all of its material advantages, the example hereinbefore described merely being preferred or exemplary embodiment.

What is claimed is:

1. A supply voltage switching circuit for a computer, the supply voltage switching circuit comprising:
 a chipset outputting a voltage for the computer, the chipset comprising:
  a first transistor having a first end connected to a first system voltage, a second end connected to a second system voltage, and a third end;
  a second transistor having a first end and a second end separately connected to a first standby voltage, a third end connected to the third end of the first transistor; and
  a node between the third end of the first transistor and the third end of the second transistor outputting the voltage for the computer;
 a third transistor having a first end connected to the first system voltage and connected to the first end of the first transistor, a second end connected to a second standby voltage, and a third end connected to a control signal from the computer and being grounded via a resistor; and
 a fourth transistor having a first end connected to the first standby voltage and connected to the first end of the second transistor, a second end connected to the second standby voltage, and a third end connected to the control signal from the computer and being grounded via another resistor.

2. The supply voltage switching circuit as claimed in claim 1, wherein a polarity of the first transistor is contrary to a polarity of the second transistor.

3. The supply voltage switching circuit as claimed in claim 1, wherein the first transistor, the second transistor, the third transistor and the fourth transistor can be metal-oxide-semiconductor field-effect transistors (MOSFETs) or bipolar junction transistors (BJTs).

4. The supply voltage switching circuit as claimed in claim 1, wherein the first system voltage is 12V.

5. The supply voltage switching circuit as claimed in claim 1, wherein the second system voltage is 5V.

6. The supply voltage switching circuit as claimed in claim 1, wherein the first standby voltage is 5V.

7. The supply voltage switching circuit as claimed in claim 1, wherein the second standby voltage is 1.8V.

8. A supply voltage switching circuit for a computer, the supply voltage switching circuit comprising:
 a first MOSFET, a gate of the first MOSFET connected to a first system voltage, a source of the first MOSFET connected to a second system voltage;
 a second MOSFET having a contrary polarity of the first MOSFET, a gate and a source of the second MOSFET respectively connected to a first standby voltage, and a drain of the second MOSFET connected to a drain of the first MOSFET, a node between the drains of the first MOSFET and the second MOSFET outputting a voltage to the computer;
 a first transistor having a first end connected to the first system voltage and connected to the gate of the first MOSFET, a second end connected to a second standby voltage, and a third end connected to a control signal from the computer; and
 a second transistor having a first end connected to the first standby voltage and connected to the gate of the second MOSFET, a second end connected to the second standby voltage, and a third end connected to the control signal from the computer.

9. The supply voltage switching circuit as claimed in claim 8, wherein the first system voltage is 12V.

10. The supply voltage switching circuit as claimed in claim 8, wherein the second system voltage is 5V.

11. The supply voltage switching circuit as claimed in claim 8, wherein the first standby voltage is 5V.

12. The supply voltage switching circuit as claimed in claim 8, wherein the second standby voltage is 1.8V.

13. The supply voltage switching circuit as claimed in claim 8, wherein the first transistor and the second transistor are Bipolar Junction Transistors (BJTs).

* * * * *